May 3, 1932. LE ROI E. HUTCHINGS 1,856,388
CARD INDEX OR RECORD DEVICE
Filed Dec. 11, 1925 5 Sheets-Sheet 1

Le Roi E. Hutchings
INVENTOR.
By Parker & Parchnow
ATTORNEYS.

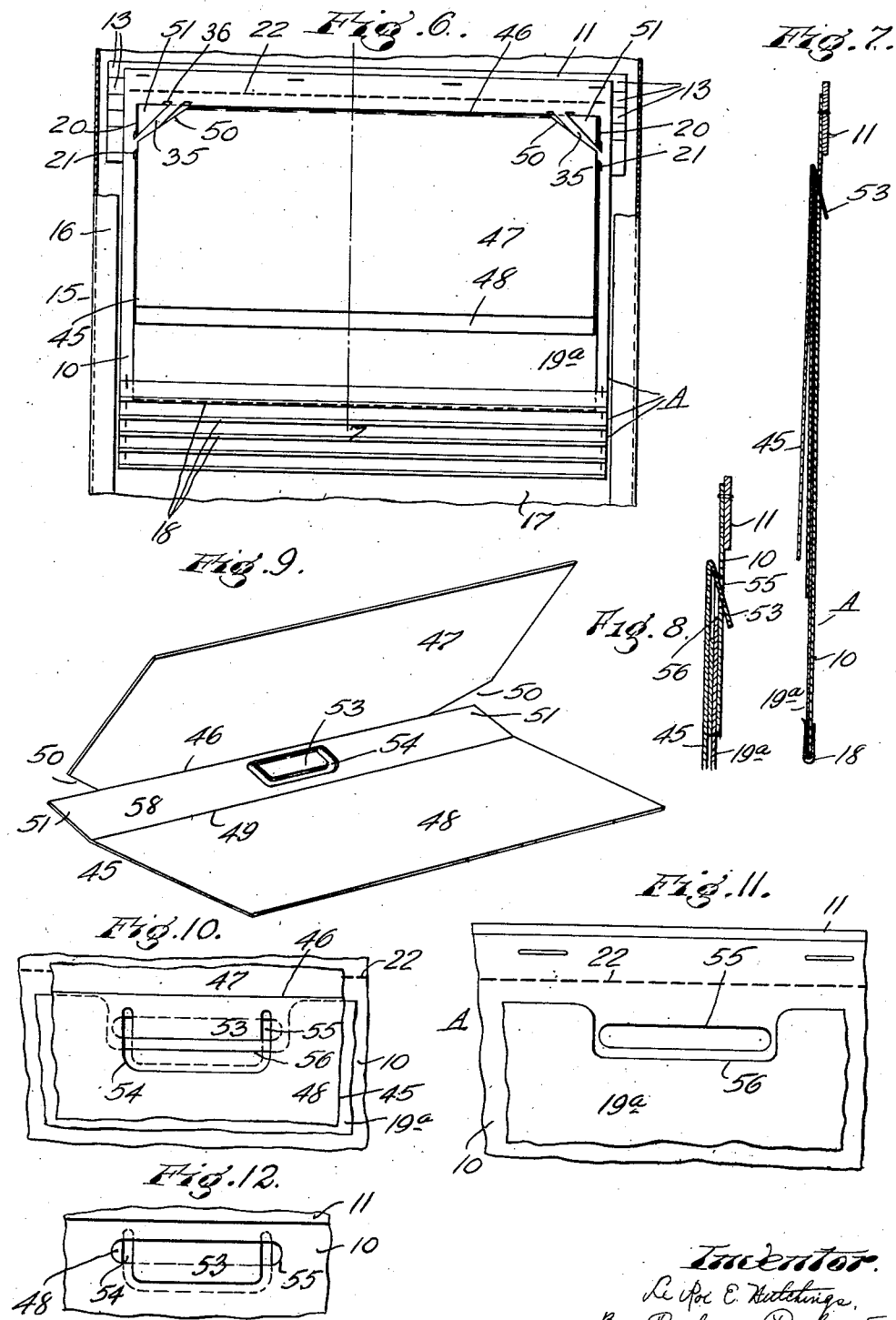

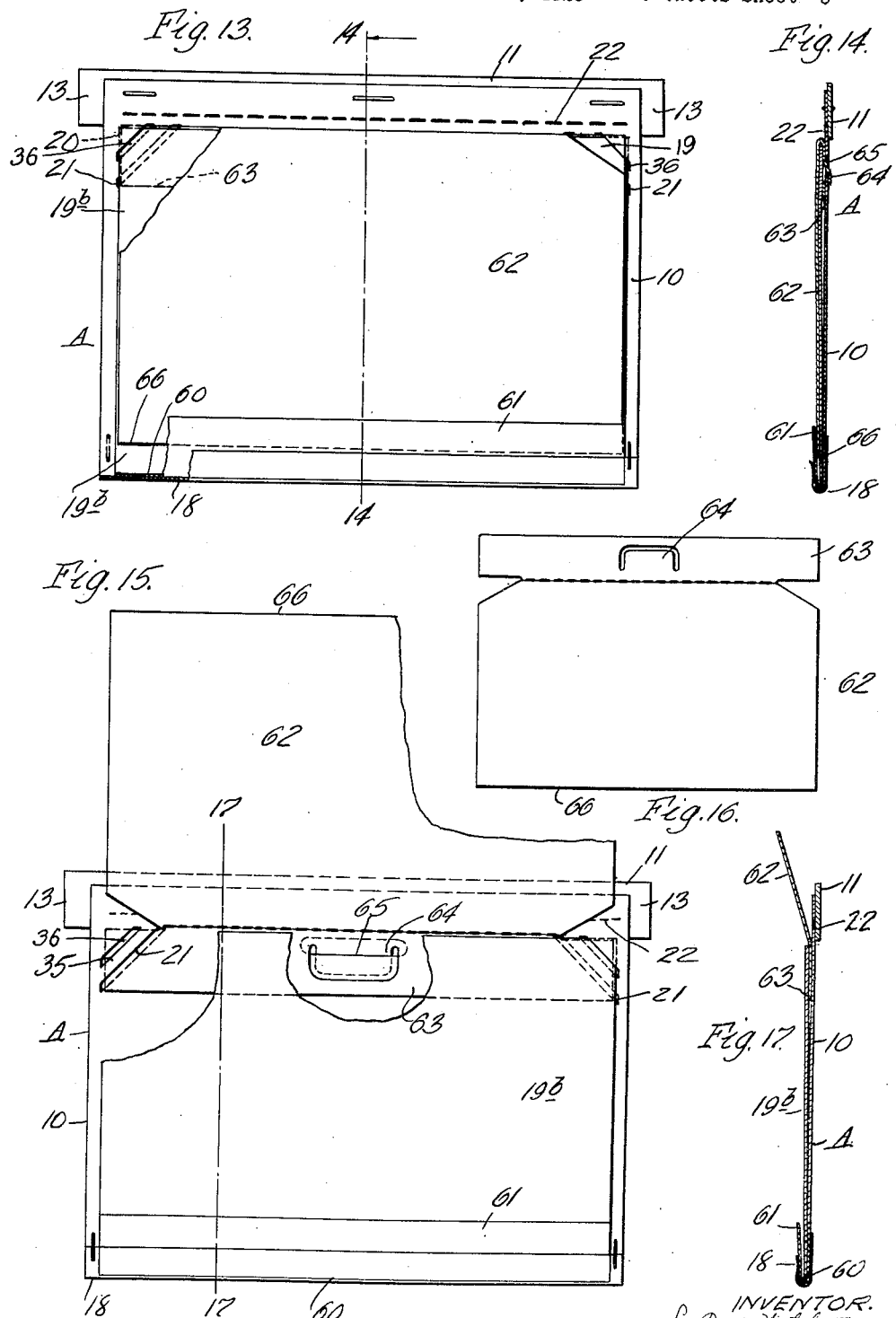

May 3, 1932.    LE ROI E. HUTCHINGS    1,856,388
CARD INDEX OR RECORD DEVICE
Filed Dec. 11, 1925    5 Sheets-Sheet 4
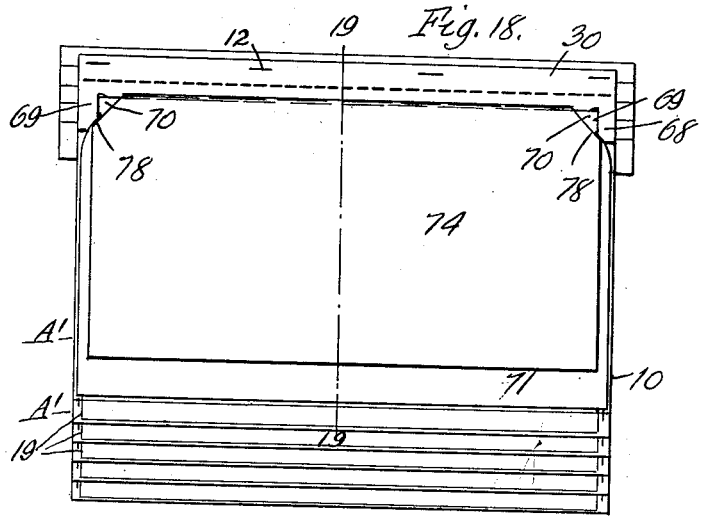
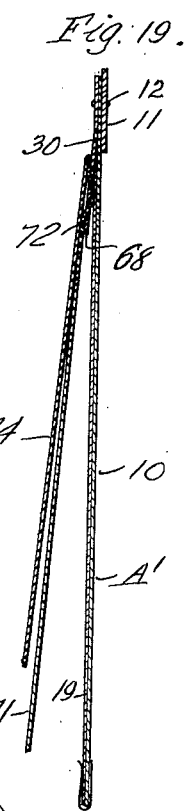
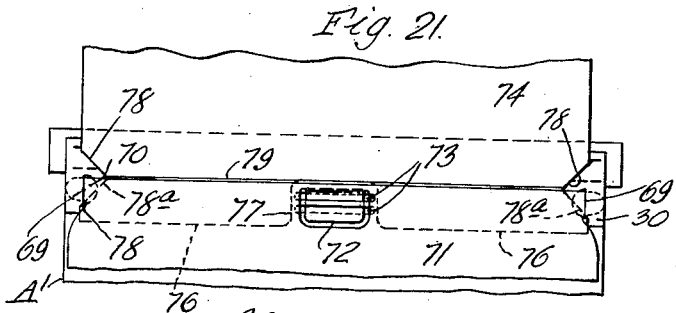
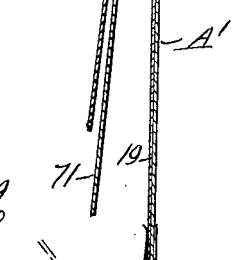
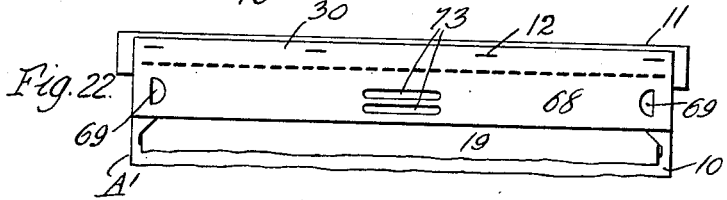
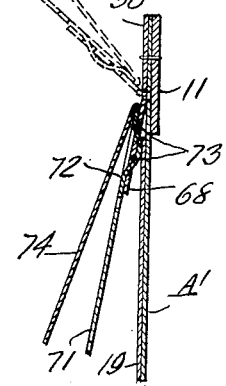
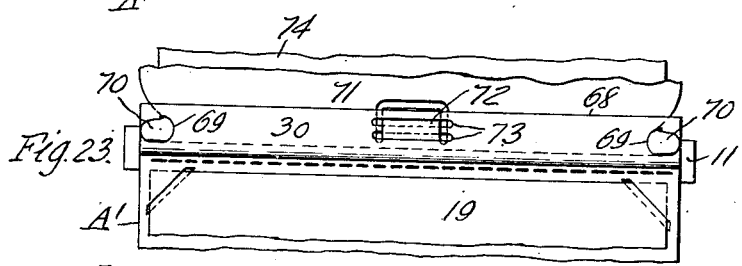
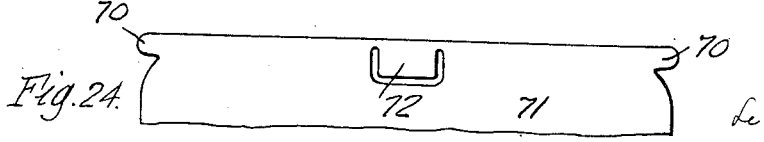
Inventor.
Le Roi E. Hutchings
By Parker & Brocknow
Attys.

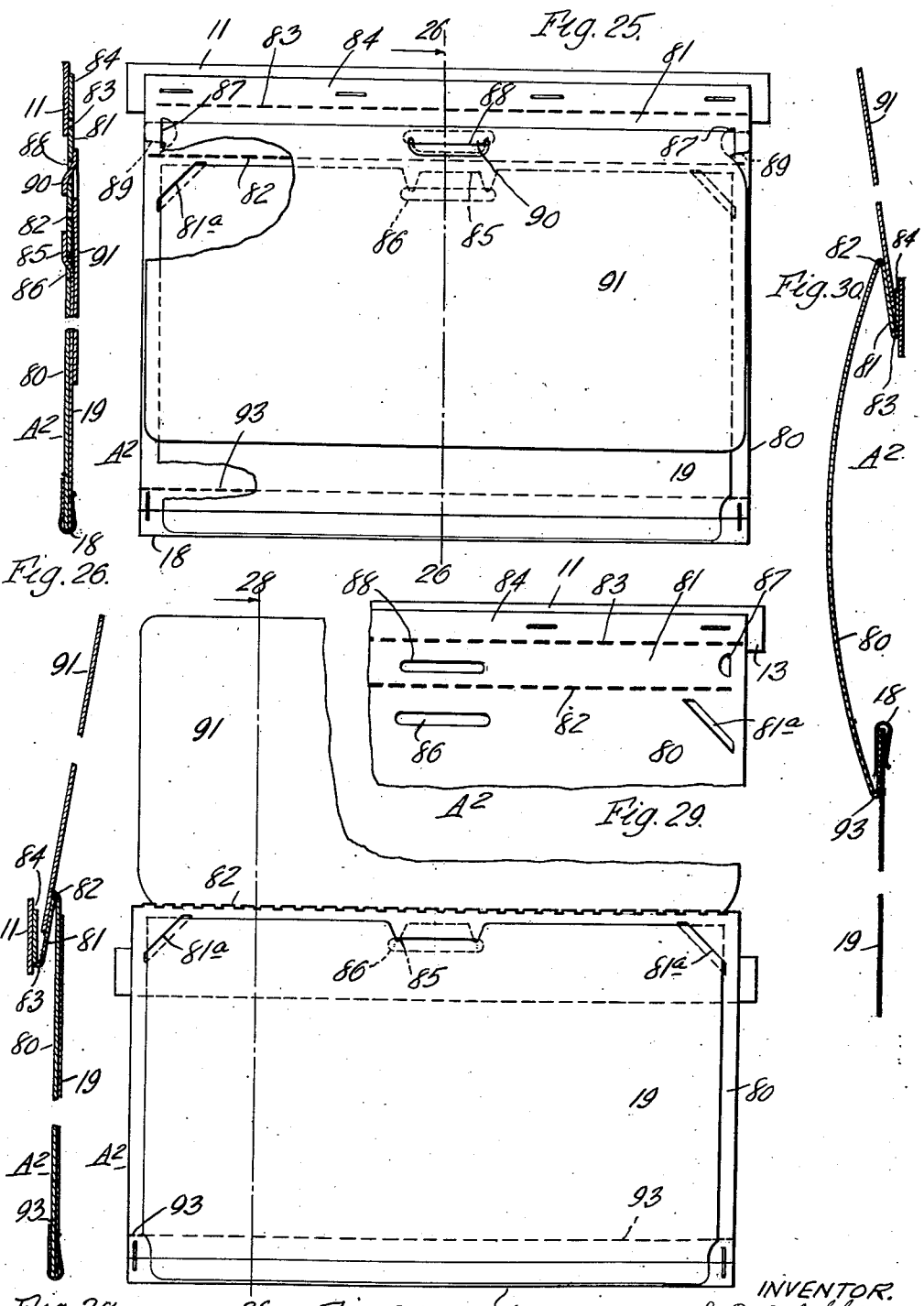

Patented May 3, 1932

1,856,388

UNITED STATES PATENT OFFICE

LE ROI E. HUTCHINGS, OF BUFFALO, NEW YORK, ASSIGNOR, BY MESNE ASSIGNMENTS, TO REMINGTON RAND INC., OF NEW YORK, N. Y., A CORPORATION OF DELAWARE

CARD INDEX OR RECORD DEVICE

Application filed December 11, 1925. Serial No. 74,842.

This invention relates to improvements in card indexes or record devices, and more particularly to that type of index in which a plurality of cards or card holders are removably supported substantially flatwise on a tray, slide or other support in series and in overlapping, nested relation with the edges of successive cards or holders projecting one beyond another, so as to visibly display index or record data pertaining to matter on the cards or card holders.

The objects of the present invention are to provide an index of this character having a plurality of card holders each of which is constructed so as to maintain or support a plurality of record cards or members one above another, in such manner that the capacity of the index will be greatly increased without materially increasing the thickness of the card series on the trays or slides; also to provide card holders and cards having improved interlocking means or parts adapted to permit a number of superimposed cards to be arranged and securely and snugly held flatwise on each holder so as to form an index unit of large capacity and minimum thickness; also to construct an index unit comprising a card holder having thereon a main or master card or record member and a plurality of sub-cards or riders arranged so that a portion of the master card is visible at all times and is available for indicating the location of related record matter on said sub-cards; also to construct said sub-cards so that they may bear record matter on more than one face thereof, and are adapted to be manipulated to display said matter without detaching them from the holder, and so that they may be moved to display the record matter on the main card without detaching them or the main card from the holder; and also to construct said main cards, sub-cards, and holders so that either of said cards may be detached from said holder without disturbing the other card. A further object of the invention is to construct main cards and sub-cards or riders for the purpose stated which may be employed in card indexes now in use; and also to provide an index unit comprising a card holder, a main card, and one or more sub-cards adapted to be employed in, and interchanged with units at present in use on card indexes.

Other objects are to improve card indexes in the other respects hereinafter specified and claimed.

In carrying out the present invention, a number of different arrangements or constructions of the card holders, main cards and sub-cards may be employed, all of which nevertheless embody the novel features of the invention.

A number of different arrangements are disclosed, by way of illustration, in the drawings, in which, Fig. 1 is a face view of a card index unit comprising a card holder having thereon a main card and a plurality of sub-cards constructed and assembled in accordance with one form of the invention.

Fig. 6 is a face view of a group of nested card index units comprising card holders of the form shown in Fig. 1, but having main and sub-cards thereon of another form, said group being shown in operative relation to a supporting tray or slide.

Fig. 7 is a cross section on line 7—7, Fig. 6, of one of the card index units.

Fig. 8 is a similar view, enlarged, of the upper portion of said unit.

Fig. 9 is a perspective view of one of the rider or sub-cards shown in Fig. 6.

Fig. 10 is a fragmentary face view of the interlocking connection between a sub-card and card holder, and a portion of the main card of said unit.

Fig. 11 is a similar view of the interlocking slot of the card holder and the adjacent portion of the main card.

Fig. 12 is a rear view of the interlocked portions of the card holder and sub-card.

Fig. 13 is a face view, partly broken away, of a card index unit, comprising the card holder of Fig. 1 and another form of main card and sub-card.

Fig. 14 is a cross section thereof on line 14—14, Fig. 13.

Fig. 15 is a fragmentary face view of said unit, with one leaf of the sub-card raised to disclose the underlying portion.

Fig. 16 is a face view of the sub-card in open position, detached from the unit.

Fig. 17 is a cross section of the unit, on line 17—17, Fig. 15.

Fig. 18 is a face view of a group of card index units comprising card holders, main cards and sub-cards of still another construction.

Fig. 19 is a cross section, on an enlarged scale, on line 19—19, Fig. 18, of one of the units.

Fig. 20 is a fragmentary similar view, on a still larger scale, of the upper portion of Fig. 19.

Fig. 21 is a face view of the upper portion of one of the units of Fig. 18, showing one leaf of the sub-card turned up.

Fig. 22 is a similar view of the upper portion of the card holder and main card.

Fig. 23 is a view similar to Fig. 21, showing the entire sub-card turned up, to expose the main card.

Fig. 24 is a view of the upper portion of the main card detached.

Fig. 25 is a face view, partly broken away, of another form of unit, having a card holder and sub-card of modified form, the main card being substantially like that of Fig. 1.

Fig. 26 is a cross section, on an enlarged scale thereof, on line 26—26, Fig. 25.

Fig. 27 is a view thereof similar to Fig. 25, showing the sub-card turned up to expose the main card.

Fig. 28 is a cross section thereof, on an enlarged scale, on line 28—28, Fig. 27.

Fig. 29 is a face view of a portion of the card holder shown in Fig. 25.

Fig. 30 is a cross section, on an enlarged scale, of the unit with the parts in position to expose the rear faces of the main card and sub-card.

Figure 1:
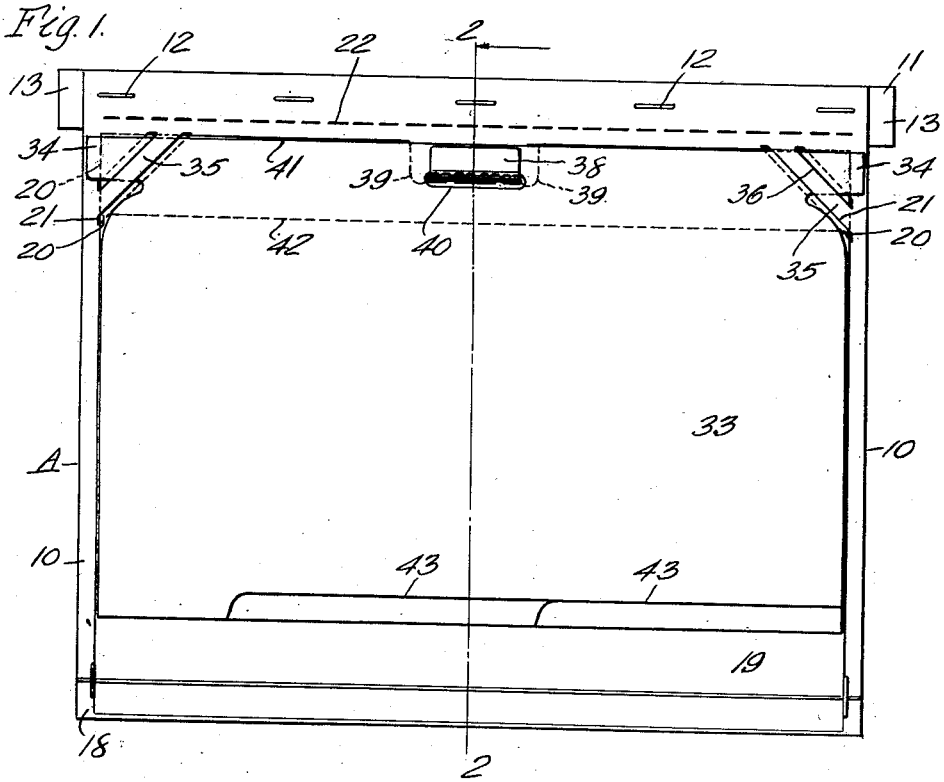
Figure 4:
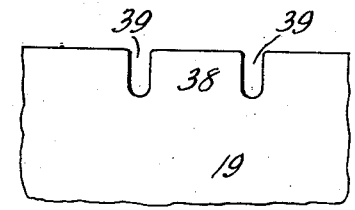
Fig. 4 is a face view of a portion of the main card, showing the interlocking tongue for connecting the card to the sub-cards.
Figure 5:
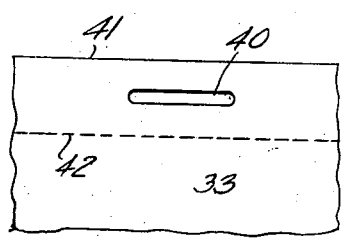
Fig. 5 is a similar view of a portion of one of the sub-cards showing the slot for receiving the interlocking tongue of the main card.

In general, the card holders shown in the drawings are of known form. For instance, see Figs. 1 to 17 inclusive, each card holder A comprises a body member 10 formed of a sheet of suitable card or paper stock, and an attaching portion 11 comprising a relatively stiff strip secured on the back of the body member 10 at or adjacent its upper edge, as by staples or wire stitches 12, and having laterally projecting ears or lugs 13. These holders A are adapted to be nested in overlapping relation with their edges exposed one beyond another, by inserting the upper edge of one of the holders between the strip and body portion of another holder, and the individual holders, or a series of holders, are adapted to be secured on a support such as the tray or slide 15, Fig. 6, by inserting the lugs 13 beneath the overhanging side flanges 16 of the tray, so that the holders lie substantially flat upon the bottom 17 thereof. The lower, free edges of the holders are, as usual, provided with transparent sheaths or pockets 18 adapted to receive the lower edge of a card or other index member 19 (hereinafter called the main card or master sheet) which card is retained in said pocket by engaging the upper corners 20 of the card in the diagonal slots 21 formed in the body portion of the card holder. The body portion 10 of the card holder is hinged at 22 to permit the same to be swung upwardly to disclose the cards on the underlying card holders. In the construction shown in Figs. 18 to 23, the card holder is constructed substantially as just described, and in addition is provided with a hinged card-supporting flap 30 secured at the upper edge of the card body by the staples 12. This card-supporting flap 30, except as hereinafter specified, is substantially as shown and described in Letters Patent Number 1,539,206, issued May 26, 1925, to James H. Rand, Jr.

In accordance with this invention, a sub-card, overlying sheet or rider, or a plurality of such cards, are detachably secured by its, or their, upper edge or edges on the card holder, and overlying the main card on the holder, with the lower edges unattached, and are formed so as to be swung upwardly to disclose their rear faces and also the underlying card. The main card, owing to the overlapping arrangement of the holders, is exposed at its lower edge and can bear an index or other data relating to the matter thereon, and also relating to the matter on the sub-cards or riders, which in turn may bear sub-indexes relating to said data. Thus, by viewing the index, the particular unit desired may be located, after which, by turning back the overlying units, the sub-indexes are exposed so that the particular sub-data required may be found.

In the arrangement shown in Figs. 1 to 5, a plurality of sub-cards, overlying sheets, record members, or riders 33 are superimposed upon or above the main card 19, and means are provided for interlocking said sub-cards with the main card 19 and indirectly with the card holder and further engaging them with the holder, so that said rider cards are held securely and snugly in place, but are nevertheless quickly detachable, either separately or all at once without disturbing the main card, and the sub-cards are adapted to be moved individually or collectively to expose both their front and rear faces for record purposes, and also to expose the main card which, if desired, can, in turn, be detached from the card holder without detaching the sub-cards.

The sub-cards 33 are shorter than the main card 19, so that their lower edges are spaced above the lower edge of the main card in order to expose and render visible matter printed thereon, and they are provided at their upper corners with attaching tongues 34 formed by cutting away the side edges of the cards, so that said tongues 34 extend outwardly beyond the edges of card 33 substantially to the edge of holder A. These tongues are adapted to be inserted into the slots 21 beneath holding strips 35 formed in the body member 10 between said slots 21 and slots 36 disposed outwardly beyond the slots 21.

Figure 3:
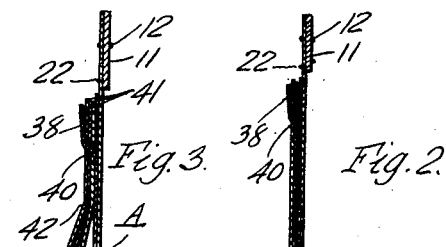
Fig. 3 is a fragmentary similar view, on an enlarged scale showing the sub-cards swung away from the main card.
Figure 2:
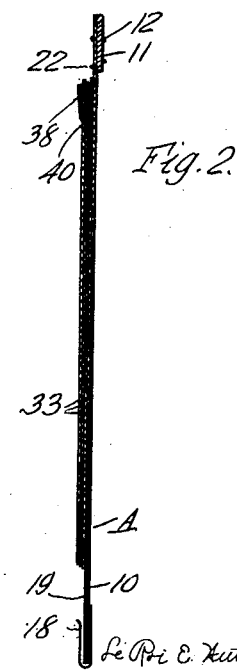
Fig. 2 is a cross section thereof on line 2—2, Fig. 1.

The means whereby the sub-cards 33 are interlocked with a main card 19 for holding the sub-card snugly against the main cards and for preventing these sub-cards from buckling, so as to disengage the tongues 34 from the slots 36, comprises a tongue 38 formed by cutting away portions at 39 from the upper edge of the main card 19, and slots 40, one of which is formed in each sub-card adjacent its upper edge 41, and said tongue 38 being adapted to be extended outwardly and upwardly through said slot or slots 40 in sub-cards 33 as shown in Figs. 1 and 3. The sub-cards 33 are preferably scored or otherwise hinged at 42 to permit them to be turned upwardly so as to expose their rear faces, and by swinging all the sub-cards upwardly, the face of the main card 19 is also exposed. If desired, the lower edges of the sub-cards 33 may be cut away, as shown at 43, so as to offset and expose a portion of the lower edge of each card which may bear a sub-index or other record matter, pertaining to index matter on the lower edge of the main card 19. The securing means and interlocking connections described are such that the sub-cards may be successively detached from the holder, or all of these cards may be detached simultaneously, without disturbing the main card, or, if desired, the main card may be removed or replaced from beneath the sub-cards without detaching the sub-cards, by first swinging the sub-cards upwardly, and then removing the corners 20 of the main card from the slots 21 of the card holder, after which the main card may be withdrawn from the pocket 18.

By means of the construction described, a plurality of the units each composed of the card holders 10, main cards 19, and sub-cards 33, may be arranged in overlapping relation on the tray or support, so that both faces of each sub-card are available for use for record purposes, by swinging superimposed units on their hinges 22 to expose a desired unit, the sub-cards of this unit being then turned back on their hinges 42 to expose the desired face of one of these cards, or to afford access to the main card of the unit. The desired unit may be identified by the record matter in the exposed pocket, and then by uncovering this unit, as explained, the sub-indexes on the sub-cards are brought to view to enable the particular sub-card desired to be in turn exposed for use. The overlying sheets 33 are adapted to bear data of a temporary nature and the master sheets 19 data of a permanent nature. Thus as a sales record, each overlying sheet 33 may contain records of sales during the months of a given year and may be replaced by new overlying sheets after the year's sales are posted on the permanent master sheet 19. As the overlying sheets 33 are securely connected at their upper edges to the holder 10 and master sheet 19, very thin and inexpensive paper stock may be used for said temporary overlapping sheets.

In the construction shown in Figs. 6 to 12, a sub-card or record member of modified construction is shown, which is attached at its upper edge to the card holder as before, but instead of being interlocked near the middle thereof with the main card as in the construction just described, is adapted to be interlocked near the center thereof with the card holder. The rider 45, see Fig. 9, comprises a sheet of material folded along a line 46, so as to provide two leaves or flaps 47 and 48 forming sub-cards, the flap 48 being in turn hinged at 49 so that the flap 47 and the hinged portion of flap 48 may be swung on their respective hinges 46 and 49, thereby permitting both faces of each flap to be used for record purposes. The main card 19a is attached to the card holder A, as shown in Fig. 1, and, except as hereinafter described, is of similar construction. For attaching the sub-card or rider 45 to the holder A, the upper flap 47 of the sub-card is cut away adjacent the hinge 46 as at 50, so as to leave unattached square portions 51 at the upper corners of the stub 58, these portions 51 being adapted to extend beneath the diagonal strips 35 formed by the adjacent diagonal slots 21 and 36 of the card holder body portion 10, see Fig. 6, and overlie the corners of the main card. For the purpose of holding the portions of the stub 58 intermediate of the corners 51 snugly against the main card 19a, and preventing it from buckling and becoming detached from the card holder, the flap 48 is provided adjacent its upper edge with the downwardly extending tongue 53 spaced from the flap by an aperture or slot 54, this tongue 53 being adapted to be received in a complementary slot 55 formed in the body portion 10 of the card holder A, thus forming an interlocking connection which securely but releasably maintains the sub-card in position, see Figs. 8, 10 and 12. The main card 19a is cut away at 56, see Fig. 11, adjacent the interlocking connection between the stub and the card holder, to provide clearance to enable this interlocking connection to be effected. The interlocking connection, as clearly shown in Figs. 8 and 10, not only maintains the intermediate portion of the stub against the holder, but as the main card is disposed between the card holder and sub-card, its middle portion is also held flat by the sub-card and its unintentional disconnection from the slots 21 is prevented. As in the first construction, the sub-card may be detached without disturbing the main card, or, if desired, the main card can be detached from the holder without necessitating the detachment of the sub-card. Furthermore, all of the faces of the flaps of the temporary sub-cards are available for use, and the main card may be exposed without detaching the sub-card.

In the modified arrangement of Figs. 13 to 17, a main card 19b is shown, which is folded adjacent its lower edge at 60, this fold being adapted to extend into the pocket 18 of the card holder A with the free edge or flap 61 extending outwardly beyond the upper edge of said pocket. The upper corners 20 of the main card 19b are attached to the card holder by inserting them in the slots 36. The sub-card 62, see Fig. 16, constructed substantially similar to the sub-card 45, Fig. 9, except that its underlying portion is shortened and forms a relatively narrow stub 63 provided with a tongue 64 intermediate of its side edges. In this construction, instead of cutting out a portion of the upper edge of the main card, as in Fig. 11, for the purpose of providing clearance for the interlocking means for the sub-card, the flap 63 of the sub-card is passed behind the upper edge of the main card with its end portions extending beneath the diagonal retaining strips 35 of the card holder, and its tongue 64 is then interlocked with the card holder by passing it through a central slot 65 thereof. In this way the intermediate upper portion of the main card 19b is held flatwise on the holder, and is prevented from buckling near the middle thereof by the overlying intermediate portion of the front leaf of the sub-card 62, which cannot move away from the holder by reason of the adjacent interlocking connection.

As shown in Fig. 13, the lower edge portion 66 of the sub-card, may, if desired, be releasably held flatwise upon the main card, as by inserting this lower edge beneath the upwardly extending flap 61 of the main card 19b. This flap 61, instead of being formed integrally with the main card, could be a separate strip of suitable material, or it can be entirely omitted, as found necessary.

In the modified form of the index unit shown in Figs. 18 to 24, the card holder A' is provided with a body portion 10, and the attaching strip 11, as before, the main card 19 being attached to the body member, as in the previous construction. In addition, the card holder is provided with the supplementary card-holding flap 30 before mentioned, which is secured at its upper edge to the upper edge of the holder, and has a depending hinged portion 68 provided adjacent its opposite sides with slots or apertures 69 for the reception of ears or attaching lugs 70 of a sub-card or rider 71. The intermediate portion of this sub-card is provided with a spaced tongue 72, similar to the tongues before described, and which is adapted to be received in a pair of spaced slots 73 of the flap 30, whereby the intermediate portion of the sub-card is held closely to the face of the flap 30 and buckling of the card and its detachment from the flap thereby prevented. If desired, an additional sub-card 74 may be superimposed upon the sub-card 71. The sub-card 74 is provided with an attaching stub 76, which is notched out intermediate of its ends at 77 to avoid interference with the interlocking connection for the sub-card 71. The card 74 and accompanying flap 76 thereof are notched at their side margins at 78. Each shoulder formed by the notch 78 on the flap portion, indicated at 78a, being adapted to extend beneath the outer connection between the lugs 70 and the slots 69, as shown. In this way the sub-card 74 is detachably, but securely, held in position flatwise on the card holder A', and is adapted to be swung on its hinge 79 to permit access to its rear face or to the sub-card 71 therebeneath, and when access is desired to the rear face of the sub-card 71 or to the main card, both the sub-card 71 and sub-card 74 are raised simultaneously by swinging them, together with the hinged flap 30, upwardly as in Fig. 23.

Still another modification of the index unit is shown in Figs. 25 to 30. In this case the card holder A², in addition to having the body portion 80, is provided with a supplementary upper portion 81 formed integrally therewith, and which is hinged thereto at 82, this portion 81 being in turn hinged at 83 to the upper edge portion 84 of the card holder, which portion is secured to the attaching flap 11. In this manner, the body portion 80 is adapted to receive, as before, the main card 19, the lower edge of which is received in the pocket 18, its upper corners being received in the slots 81a of the holder, while its intermediate upper portion is held flat against the body member 80 by a tongue 85 formed on the main card, and which is adapted to enter a slot 86 in said body portion. The upper hinged portion 81 forms, substantially, an equivalent of the flap 30 shown in Figs. 18 to 23, this portion being provided with opposite outer slots 87 and an intermediate slot 88 for the reception respectively of end lugs 89 and a central, intermediate tongue 90 on a sub-card 91. If desired, an additional sub-card 74, as previously described, may be superimposed upon the card 91. When it is desired to expose the under side of the sub-card 91, this card is swung upwardly, and by its attachment to the portion 81, this portion is turned backwardly by means of the hinges 82 and 83, as shown in Figs. 27 and 28, thus exposing the rear face of the card 91 and the front face of the main card 19. If desired, the lower portion of the body member 80 of the holder A² may be hinged, as at 93, so that by disengaging the upper corners of the main card, and swinging this card downwardly, as shown in Fig. 30, its rear face may be exposed for use. It is obvious that the body portions of the card holders A, A' previously described could also be hinged in this manner, if desired, for the purpose of exposing the rear faces of the main cards.

In all of the various forms of the invention shown and described, index units are provided which are adapted when arranged in their overlapping nested relation to form a card index of relatively large capacity, and which, by reason of the hinged construction of the rider cards, may be used with great facility. The interlocking connections provided, enable rider cards formed of relatively thin stock to be used without the danger of these cards becoming disconnected from the card holders.

Some forms of the main cards and sub-cards described are adapted to be employed in indexes now in use, thus increasing the capacity thereof, and the units shown can also be incorporated in, or interchanged with, indexes now in use.

I claim:—

1. In a record device, a unit comprising a card holder, a main index card, means for detachably connecting the same to said holder, a sub-card superimposed upon said main card, means for detachably securing said sub-card on said holder, and means adjacent the top edges of said holder, main card and sub-card for releasably holding the intermediate portions of said cards in adjacent relation to each other.

2. In a record device, a unit comprising a card holder, a main index card, means for detachably connecting the upper corners of said main card to said holder, a sub-card superimposed upon said main card, means for detachably connecting the upper corners of said sub-card to said holder, and means adjacent the top edges of said holder, main card and sub-card for releasably holding the intermediate portions of said cards in adjacent relation to each other.

3. In a record device, a unit comprising a card holder having a body portion, an attaching portion secured to one edge thereof and adapted to releasably secure said holder to a support, and a pocket at the opposite edge of said body portion, a main index card disposed flatwise on said body portion and having an edge inserted in said pocket, a sub-card superimposed upon said main card, means for detachably securing the upper portion thereof to said holder, said sub-card being hinged adjacent said upper portion so as to swing on said hinge to expose its rear face and to expose said main card, and said main and sub-cards being constructed so that either may be detached from or secured to said holder without detaching the other therefrom.

4. In a record device, a unit comprising a card holder having a body portion and an attaching portion secured to one edge thereof and adapted to releasably secure said holder to a support, a main card disposed flatwise on said body portion, means for detachably securing the lower marginal portion and the upper corners thereof to said body portion, a sub-card superimposed upon said main card, means for detachably securing the upper corners thereof to said holder, interlocking means for releasably holding said cards in adjacent relation to each other, and said main and sub-cards being constructed so that either may be detached from or secured to said holder without detaching the other therefrom.

5. In a record device, a unit comprising a card holder, a main index card, means for detachably connecting the same to said holder, a sub-card superimposed upon said main card, said sub-card being creased transversely to provide a hinge portion, means for detachably securing said hinge means to said holder adjacent opposite ends of said crease, and means adjacent said crease for releasably holding the intermediate portions of said main card and sub-card in adjacent relation.

6. In a record device, a unit comprising a card holder, a main index card, means for detachably connecting the same to said holder, a sub-card superimposed upon said main card, said sub-card being creased transversely to provide a hinge portion, means for detachably securing said hinge means to said holder adjacent opposite ends of said crease, and means adjacent said crease for releasably holding the intermediate portions of said main card and sub-card closely in adjacent relation, said creased sub-card and said main card being constructed so that either may be detached from or secured to said holder without detaching the other therefrom.

7. In a record device, a unit comprising a card holder, a main index card, means for detachably connecting the same to said holder, a sub-card superimposed upon said main card, said sub-card being creased transversely to form two leaves one overlying the other, means for detachably securing the same to said holder adjacent opposite ends of said crease, said overlying leaf of said sub-card being adapted to swing on said crease to expose its rear face and the front face of said underlying leaf, and said underlying leaf being hinged so as to expose its rear face and said main card.

8. In a record device, a unit comprising a card holder, a main index card, means for detachably securing the same on said holder, and one or more sub-cards superimposed upon said main card, means for detachably securing said sub-card or cards on said holder, and an interlocking connection between said main and sub-cards for holding said cards snugly on said holder and for preventing their unintentional disengagement therefrom.

9. In a record device, a unit comprising a card holder, a main index card, means for detachably securing the same on said holder, one or more sub-cards superimposed upon said main card, means for detachably securing said sub-card or cards on said holder, and an interlocking connection between said main and sub-cards, said detachable connections between said cards and said holder and said interlocking connection between said main and sub-cards being such that said sub-card or cards may be detached from or secured to said holder without disconnecting said main card therefrom.

10. In a record device, a unit comprising a card holder, a main index card, means for detachably securing the same on said holder, one or more sub-cards superimposed upon said main card, means for detachably securing said sub-card or cards on said holder, and an interlocking connection between said main and sub-cards, said detachable connections between said cards and said holder and said interlocking connection between said main and sub-cards being such that said main card may be detached from said holder without disconnecting said sub-cards therefrom.

11. In a record device, a unit comprising a card holder, a main index card, means for detachably securing the same on said holder, a sub-card superimposed upon said main card, means for detachably securing said sub-card on said holder, and an interlocking connection between said sub-card and said holder adapted to hold said main card and said sub-card snugly on said holder, said interlocking connection being constructed to permit either said main card or said sub-card to be secured on or detached from said holder without detaching the other therefrom.

12. In a record device, a unit comprising a card holder, having a body portion and an attaching portion for releasably connecting said holder to a support, a main index card, means for detachably securing the upper and lower edges thereof to said holder adjacent the upper and lower edges of said body portion, one or more sub-cards, a flap secured to the upper edge of said card holder, means for detachably securing said sub-card or cards to said flap, and said flap being hinged to said holder to permit said sub-card or cards to be turned back to expose their rear faces and said main card.

13. In a record device, a unit comprising a card holder having a body portion and an attaching portion for releasably connecting said holder to a support, a main index card, means for detachably securing the upper and lower edges thereof to said holder adjacent the upper and lower edges of said body portion, one or more sub-cards, a flap secured to the upper edge of said card holder, means for detachably securing the corners of said sub-card or cards to said flap and an interlocking connection between the intermediate upper portion of one of said sub-cards and said flap.

14. In a record device, a plurality of card holders arranged in overlapping relation substantially flatwise on a support with an edge of each exposed beyond the edge of an adjacent holder, and having a main index card detachably secured on each holder with one edge adjacent said exposed edge of said holder and visible therewith, a sub-card superimposed on said main card and detachably secured by one edge portion to said holder, interlocking connections between the cards and holder disposed intermediate of the side edges of said main and sub-cards and adjacent the attached edge thereof, said interlocking connections and said card-securing means being constructed so that either of said cards may be detached from said holder without detaching the other therefrom.

15. In a record device, a unit comprising a card holder, a main index card, means for detachably connecting the same to said holder, a plurality of sub-cards superimposed upon said main card, each of said sub-cards being attached at one edge to said holder for hinging movement relative thereto and to each other and adapted to be turned back to expose the rear face thereof or the top face of the nether card, each of said sub-cards being adapted to bear record matter on both the front and rear faces thereof.

16. In a record device, a unit comprising a card holder, a main index card, means for detachably connecting the same to said holder, a plurality of sub-cards superimposed upon said main card and each having a portion adapted to be detachably connected to said holder, and a record-receiving portion hinged thereto to permit said portion to be selectively turned back to expose its rear face and the record-receiving portions of the underlying sub-card and said main card, said sub-cards being shorter than said main card whereby a portion of said main card is visible for record purposes.

17. A record device, a plurality of card holder members arranged in overlapping relation substantially flatwise on a support, a main index card member detachably secured on each holder member, a sub-card superimposed on each main card member, and means for detachably connecting the upper edge of said sub-card to one of said members, said sub-card being hinged whereby it may be swung from said holder and main card members and expose its rear face.

LE ROI E. HUTCHINGS.